(12) United States Patent
Harada

(10) Patent No.: US 7,529,954 B2
(45) Date of Patent: *May 5, 2009

(54) INFORMATION PROCESSING APPARATUS CONTROL METHOD, INFORMATION PROCESSING APPARATUS, AND STORAGE DEVICE CONTROL METHOD

(75) Inventor: Akitatsu Harada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 11/500,886

(22) Filed: Aug. 9, 2006

(65) Prior Publication Data

US 2006/0271803 A1 Nov. 30, 2006

Related U.S. Application Data

(63) Continuation of application No. 10/852,399, filed on May 25, 2004, now Pat. No. 7,117,350.

(30) Foreign Application Priority Data

Feb. 26, 2004 (JP) ............................. 2004-051144

(51) Int. Cl.
*G06F 1/00* (2006.01)
(52) U.S. Cl. ................... 713/300; 711/170; 709/220
(58) Field of Classification Search ................ 713/300; 711/170; 709/220
See application file for complete search history.

(56) References Cited

U.S. PATENT DOCUMENTS

| 5,699,548 | A | 12/1997 | Choudhury et al. ......... 711/142 |
| 6,002,674 | A | 12/1999 | Takei et al. ................ 370/254 |
| 6,425,049 | B1 | 7/2002 | Yamamoto et al. |
| 6,615,313 | B2 | 9/2003 | Kato et al. |
| 6,826,005 | B2 | 11/2004 | Hakamata et al. |
| 7,117,350 | B2 * | 10/2006 | Harada ........................... 713/1 |
| 2002/0152416 | A1 | 10/2002 | Fukuda |
| 2003/0065902 | A1 | 4/2003 | Shiga et al. |
| 2003/0081621 | A1 | 5/2003 | Godfrey et al. ............. 370/400 |
| 2003/0135590 | A1 | 7/2003 | Rezaul et al. ............... 709/220 |
| 2003/0182494 | A1 | 9/2003 | Rodrigues et al. |
| 2003/0220991 | A1 | 11/2003 | Soejima et al. ............. 709/221 |

(Continued)

FOREIGN PATENT DOCUMENTS

JP 2003108412 4/2003

*Primary Examiner*—Thomas Lee
*Assistant Examiner*—Vincent T Tran
(74) *Attorney, Agent, or Firm*—Brundidge & Stanger, P.C.

(57) ABSTRACT

A control method of controlling an information processing apparatus including a CPU, a memory, and an input unit. The memory stores virtual configuration information including setting information of the storage device. The memory stores information indicating whether a management mode as a control method of the configuration information is a first mode or a second mode. The control method of the apparatus includes the steps executed by the CPU of receiving a setting instruction of the configuration information from the input unit, updating the virtual configuration information according to the setting instruction when the memory stores information indicating that the management mode is the first mode, storing the setting instruction to update the virtual configuration information, transmitting the setting instruction from the memory to the storage device, and transferring the setting instruction to the storage device when the memory stores information indicating that the management mode is the second mode.

15 Claims, 17 Drawing Sheets

U.S. PATENT DOCUMENTS

2004/0073747 A1 4/2004 Lu
2004/0133742 A1 7/2004 Vasudevan et al.
2004/0199720 A1 10/2004 Soejima et al.
2005/0021908 A1 1/2005 Ohno et al.

* cited by examiner

FIG. 4

| SETTING INSTRUCTION | | | |
|---|---|---|---|
| SEQUENCE | COMMAND | PARAMETER | RESTART INFORMATION |
| 1. | OPTION 1 | | 1 |
| 2. | OPTION 2 | | 1 |
| 3. | LU DEFINITION | LUN=10 size=100MB | |
| 4. | LU DEFINITION | LUN=11 size=200MB | |
| 5. | LU DEFINITION | LUN=12 size=300MB | |
| 6. | LU DEFINITION | LUN=13 size=400MB | |
| 7. | LU DEFINITION | LUN=14 size=500MB | |
| 8. | LU FORMAT | LUN=10 | |
| 9. | LU FORMAT | LUN=11 | |
| 10. | LU FORMAT | LUN=12 | |
| 11. | LU FORMAT | LUN=13 | |
| 12. | LU FORMAT | LUN=14 | |
| 13. | LU DELETION | LUN=13 | |
| 14. | LU DELETION | LUN=14 | |
| 15. | LU DEFINITION | LUN=14 size=1GB | |
| 16. | LU FORMAT | LUN=14 | |

FIG. 7

| No | SETTING INSTRUCTION COMMAND | PARAMETER | RESTART INFORMATION |
|---|---|---|---|
| 1. | OPTION 1 | | |
| 2. | OPTION 2 | | |
| 3. | LU DEFINITION | (LUN.size)=(10.100MB)(11.200MB)(12.300MB)(14.1GB) | |
| 4. | LU FORMAT | LUN=10-12 14 | 1 |

INFORMATION PROCESSING APPARATUS CONTROL METHOD, INFORMATION PROCESSING APPARATUS, AND STORAGE DEVICE CONTROL METHOD

The present application is a continuation of application Ser. No. 10/852,399, filed May 25, 2004, now U.S. Pat. No. 7,117,350, which claims priority from Japanese application JP2004-051144, filed on Feb. 26, 2004, the contents of which is incorporated herein by reference.

BACKGROUND OF THE INVENTION

The present invention relates to an information processing apparatus control method, an information processing apparatus, and a storage device control method.

To use a storage device, it is necessary for the manager to set information of a configuration or a layout of the storage device. The configuration includes, for example, information of definitions of logical units configured in hard disk drives of the storage device.

From an information processing apparatus communicably connected to the storage device, the manager transmits instructions such as an instruction to set the configuration information and an instruction to refer thereto to the storage device.

Depending on cases, the information processing apparatus stores as a database a copy of the configuration information of the storage device. By referring to the configuration information stored in the storage device, the information processing apparatus can creates a setting instruction to be sent to the storage device.

For example, JP-A-2003-108412 describes a procedure of updating such configuration information. Specifically, when the configuration information of a storage device is updated, an information processing apparatus connected to the storage device transfers information of any change in the configuration information to the information processing apparatus (a storage management server) to thereby update the configuration information stored in the database of the information processing apparatus.

In operations such as an operation to initialize a storage device and an operation to replace a hardware unit, many configuration information items are required to be set. Once the information processing apparatus transmits a first setting instruction to the storage device, the information processing apparatus can send a second setting instruction thereto only after receiving a reply from the storage device in response to the first setting instruction. That is, in the setting of a plurality of configuration information items, a period of wait time takes place for the communication of information between the information processing apparatus and the storage device. This resultantly deteriorates operability of the storage device.

SUMMARY OF THE INVENTION

It is therefore an object of the present invention to provide an information processing apparatus control method, an information processing apparatus, and a storage device control method to remove the problem.

To achieve the object in accordance with the present invention, there is provided a control method of controlling an information processing apparatus communicably connected to a storage device, the apparatus including a central processing unit (CPU), a memory, and an input unit. The memory stores, as virtual configuration information, configuration information including setting information of hard disk drives of the storage device. The memory stores information indicating whether a control mode as a control method of the configuration information is a first mode or a second mode. The information processing apparatus control method comprising the steps of receiving by the CPU a setting instruction of the configuration information from the input unit, updating by the CPU, when the memory stores information indicating that the management mode is the first mode, the virtual configuration information into the memory according to the setting instruction; storing by the CPU the setting instruction to update the virtual configuration information into the memory, transmitting by the CPU the setting instruction from the memory to the storage device, and transferring by the CPU, when the memory stores information indicating that the management mode is the second mode, the setting instruction to the storage device.

As described above, there can be provided an information processing apparatus control method, an information processing apparatus, and a storage device control method in accordance with the present invention.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing setting instructions stored in a setting instruction memory function of the embodiment.

FIG. 7 is a diagram showing collected setting instructions in the embodiment.

DESCRIPTION OF THE EMBODIMENTS

Storage Device

Figure 1:
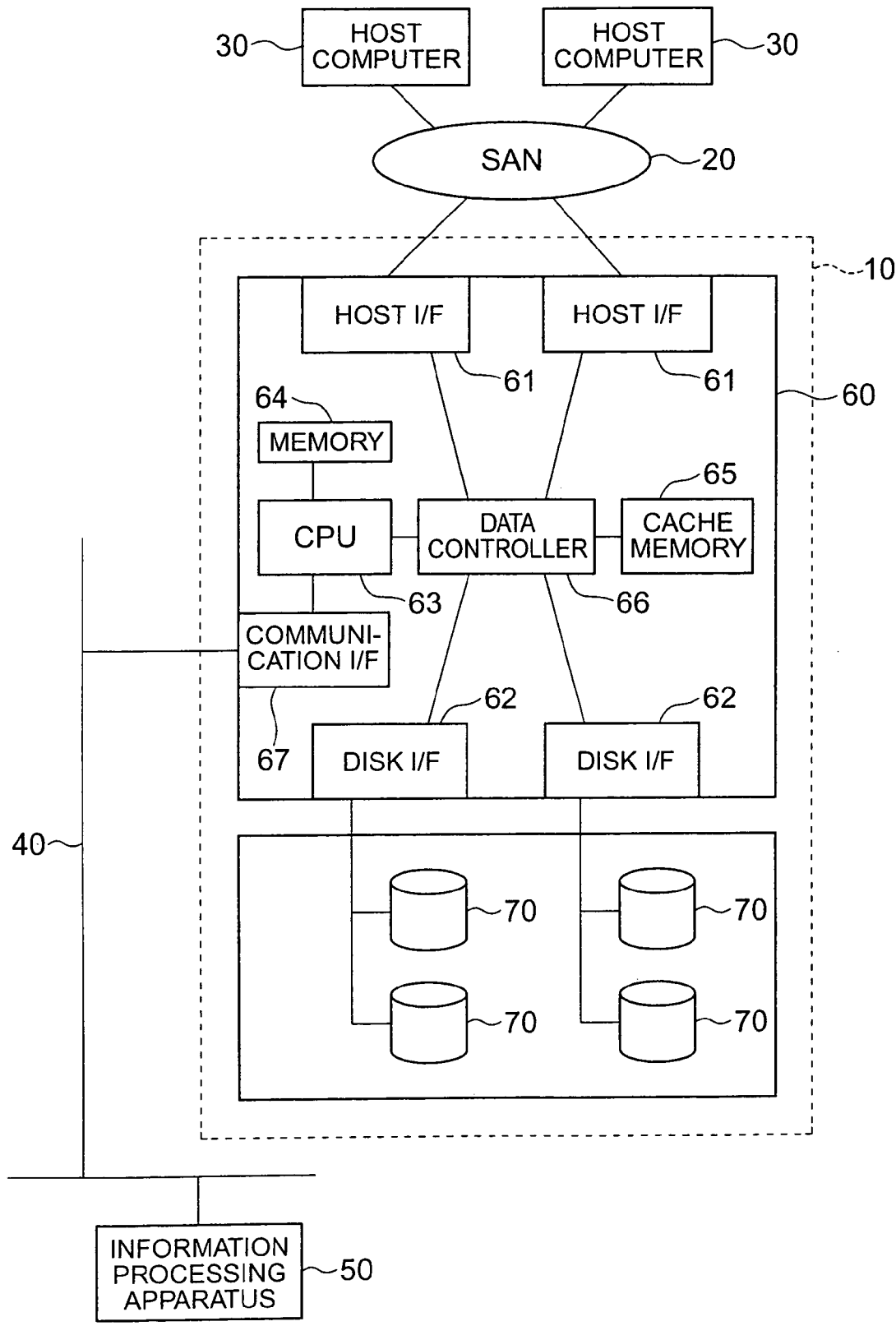
FIG. 1 is a block diagram showing a hardware configuration of a storage device in an embodiment according to the present invention.

FIG. 1 shows in a block diagram a hardware configuration of a storage device 10 in an embodiment of the present invention.

The storage device 10 is connected via a storage area network (SAN) to host computers 30 and via a communication network 40 to an information processing apparatus or information processor 50.

The host computer 30 is, for example, a personal computer, a workstation, or a mainframe computer. An operating system operates on the host computer 30. Application software including application programs operates under control of the operating system. The application software provides functions of, for example, an automatic teller system of a bank and a seat reservation system of an airline.

The storage device 10 includes a controller 60 and hard disk drives 70. The controller 60 includes host interfaces 61, disk interfaces 62, a central processing unit (CPU) 63, a memory 64, a cache memory 65, a data controller 66, and a communication interface 67.

The host interfaces 61 is an interface to communicate with the host computers 30. The interface 61 has a function to receive a block access request according to a fibre channel protocol.

The disk interfaces 62 is an interface to communicate data with the hard disk drives 70 in response to an instruction from the CPU 63. The interface 62 has a function to transmit a data input/output (I/O) request to one of hard disk drives 70 according to a protocol stipulating commands controlling the drive 70.

The CPU 63 controls the overall operation of the storage device 10. Specifically, the CPU 63 executes microprograms stored in the memory 64 to control operations of the host interfaces 61, the disk interfaces 62, the data controller 66, and the communication interface 67.

The cache memory 65 is employed to temporarily store data communicated between the host interfaces 61 and the disk interfaces 62.

The data controller 66 transfers data under supervision of the CPU 63 between the host interfaces 61 and the cache memory 65 or between the cache memory 65 and the disk interfaces 62.

The communication interface 67 is an interface to communicate data via the communication network 40 with the information processor 50. The communication network 40 is a communicating module such as a local area network. The network 40 is not limited to LAN but may be, for example, a communication interface according to a small computer system interface (SCSI) standard.

Depending on cases, the controller 60 may include a function to control the hard disk drivers 70 according to, for example, a redundant array of inexpensive disks (RAID) level 0, 1, or 5 of the RAID standard. In the RAID specifications, a plurality of hard disks 70 are controlled as one group (to be called an RAID group hereinbelow). The RAID group includes logical units (LU) as access units to be accessed by the host computers 30. Each logical unit is assigned with an identifier called a logical unit number (LUN).

The storage device 10 may be configured in other than that described above. The device 10 may function as, for example, a network attached storage constructed to receive a data I/O request specified with a file name from the host computers 30 according to a protocol such as a network file system (NFS) protocol.

The storage device 10 keeps information items in the memory 64 and/or the cache memory 65 such as setting information of capacity of the hard disk drives 70, setting information of RAID groups, setting information of logical units, and information indicating a state of the controller 60. The information items are collectively called configuration information in the description of the embodiment.

The information processing apparatus 50 is a computer to manage the storage device 10. The apparatus 50 includes a function to refer to the configuration information of the storage device 10 and a function to update the configuration information to alter various setting items in the storage device 10.

The apparatus 50 may be a computer to exclusively conduct maintenance and management for the storage device 10. Or, a general computer may be used if the computer has such a function to maintain and to manage the storage device 10.

Information Processing Apparatus

Figure 2:
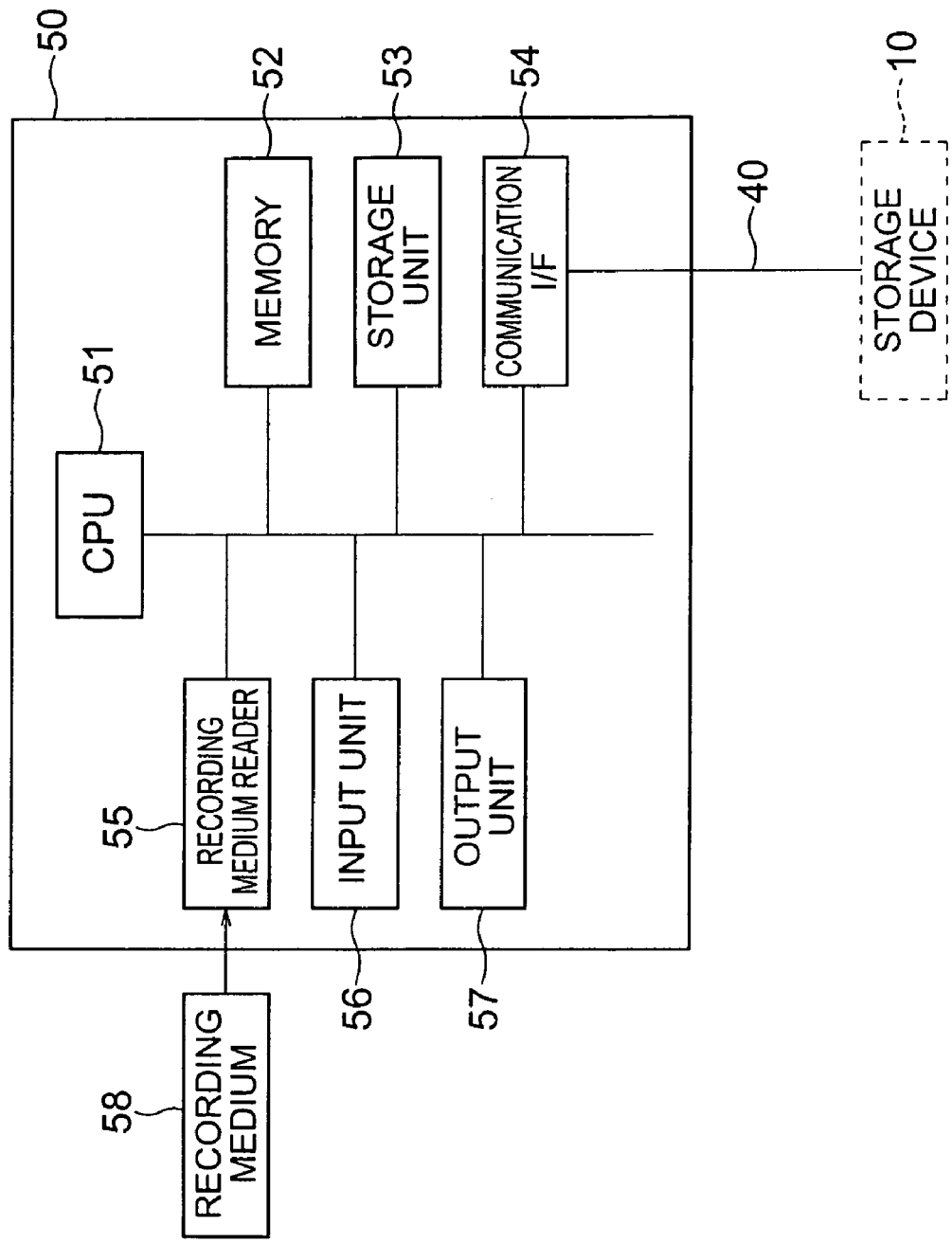
FIG. 2 is a block diagram showing a hardware configuration of an information processing apparatus of the embodiment.

FIG. 2 shows a hardware configuration of the information processing apparatus 50 of the embodiment in a block diagram. The apparatus 50 includes a CPU 51, a storage unit 53, a communication interface 54, a recording medium reader 55, an input unit 56, and an output unit 57.

The CPU 51 controls the overall operation of the information processor 50. By executing programs stored in the memory 52 and the storage unit 53, the CPU 51 maintains and controls the storage device 10.

The recording medium reader 55 is a device to read programs and data written on the recording medium 58. The programs and the data are stored in the memory 52 and/or the storage unit 53. The recording medium 58 may be, for example, a flexible disk, a compact disk read only memory (CD-ROM), or a semiconductor memory. The reader 55 may be integrally arranged in the information processor 50. The storage unit 53 is, for example, a hard disk unit or a semiconductor memory.

The input unit 56 is used by a manager or other operators, for example, to supply data to the information processor 50. The input unit 56 may include, for example, a keyboard and/or a mouse.

The output unit 57 is used to deliver information to an external device. The output unit 57 may include, for example, a display and/or a printer.

The communication interface 54 is an interface to communicate data via the communication network 40 with the storage device 10.

The information processor 50 includes a storage control system as a system to control the configuration information of the storage device 10. The system is implemented when the CPU 1 executes programs moved from the recording medium 58 into the memory 52 and/or the storage unit 53.

Functions of Information Processing Apparatus

Figure 3:
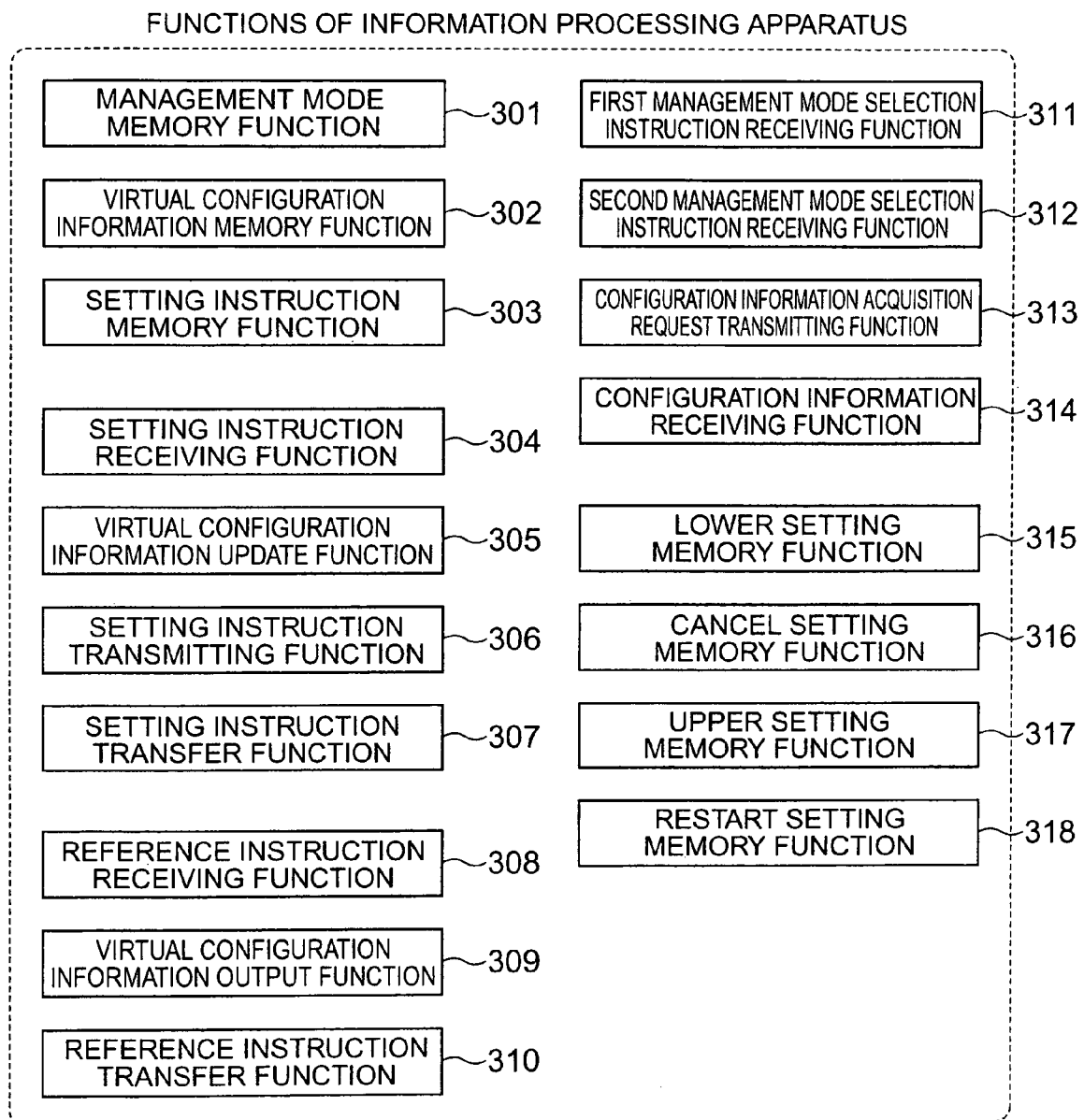
FIG. 3 is a block diagram showing functions of the information processing apparatus of the embodiment.

FIG. 3 shows functions of the information processing apparatus 50 of the embodiment. These functions are implemented by the hardware of the apparatus 50 or the software in the memory 52 or the storage unit 53 to be executed by the CPU 1.

The configuration information of the storage device 10 is managed in two management modes, i.e., a synchronous mode and an asynchronous mode. A control mode memory function 301 stores information indicating whether the mode is the synchronous mode or the asynchronous mode.

In the synchronous mode, when a setting instruction receiving function 304 receives a setting instruction of the configuration information, a setting instruction transmitting function 306 transmits the setting instruction to the storage device 10. The receiving function 304 can receive a subsequent setting instruction only after a reply is received in response to the preceding setting instruction from the storage device 10. Therefore, when setting a plurality of configuration information items, a period of wait time takes place due to information communication between the information processor 50 and the storage device 10. This deteriorates operability of the storage device.

In the asynchronous mode, a virtual configuration information memory function 302 keeps therein virtual configuration information including the configuration information of the storage device 10. When the receiving function 304 receives a setting instruction of the configuration information, a virtual configuration information update function 305 updates the virtual configuration information according to the setting instruction and returns a reply. As a result, the receiving function 304 can receive a subsequent setting instruction. Therefore, in the asynchronous mode, the information communication between the information processor 50 and the storage device 10 conducted for each setting instruction in the synchronous mode is not carried out. In consequence, the response to the setting instruction is carried out at a higher speed and operability is improved when compared with the operation in the synchronous mode.

The setting instruction received by the receiving function 304 in the asynchronous mode is stored in a setting instruction memory unit 303. A setting instruction transmitting function 306 sends a plurality of setting instructions from the memory unit 303 to the storage device 10 at predetermined timing. This reflects the setting instructions in the configuration information of the storage device 10.

Other functions of the information processor 50 will be described later.

Setting Instruction

FIG. 4 shows setting instructions stored in the setting instruction memory function 303. The memory function 303 keeps the setting instructions of configuration information received by the receiving function 304 when the management mode is the asynchronous mode. Each setting instruction in the memory function 303 includes "sequence (number)", "command", "parameter", and "restart information". The sequence number indicates a sequence number assigned to the setting instruction. The number is assigned in an order of reception of the instruction by the receiving function 304. For a setting instruction to define, for example, a logical unit, the command is "LU definition" and the parameter is "LU number (LUN) and a logical unit size". The restart information is information to indicate whether the storage device 10 is to be restarted to reflect the setting instruction in the configuration information. In FIG. 4, a setting instruction including "1" in the restart information indicates that the restart of the storage device 10 is required to reflect the setting instruction in the configuration information. The setting instruction requiring the restart is, for example, a setting instruction of an option to use a logical unit.

FIG. 4 includes a plurality of setting instructions for logical unit definitions and logical unit formats. To transmit the setting instructions from the memory function 303 to the storage device 10, those instructions having the same command may be collectively treated (batch processing). However, when these setting instructions are simply collected, the sequence of the instructions is changed and hence a conflict may take place in some cases.

In the embodiment, by controlling a relationship of dependence between the setting instructions, such a conflict is prevented from occurring in the collective treatment of the setting instructions.

Figure 5:
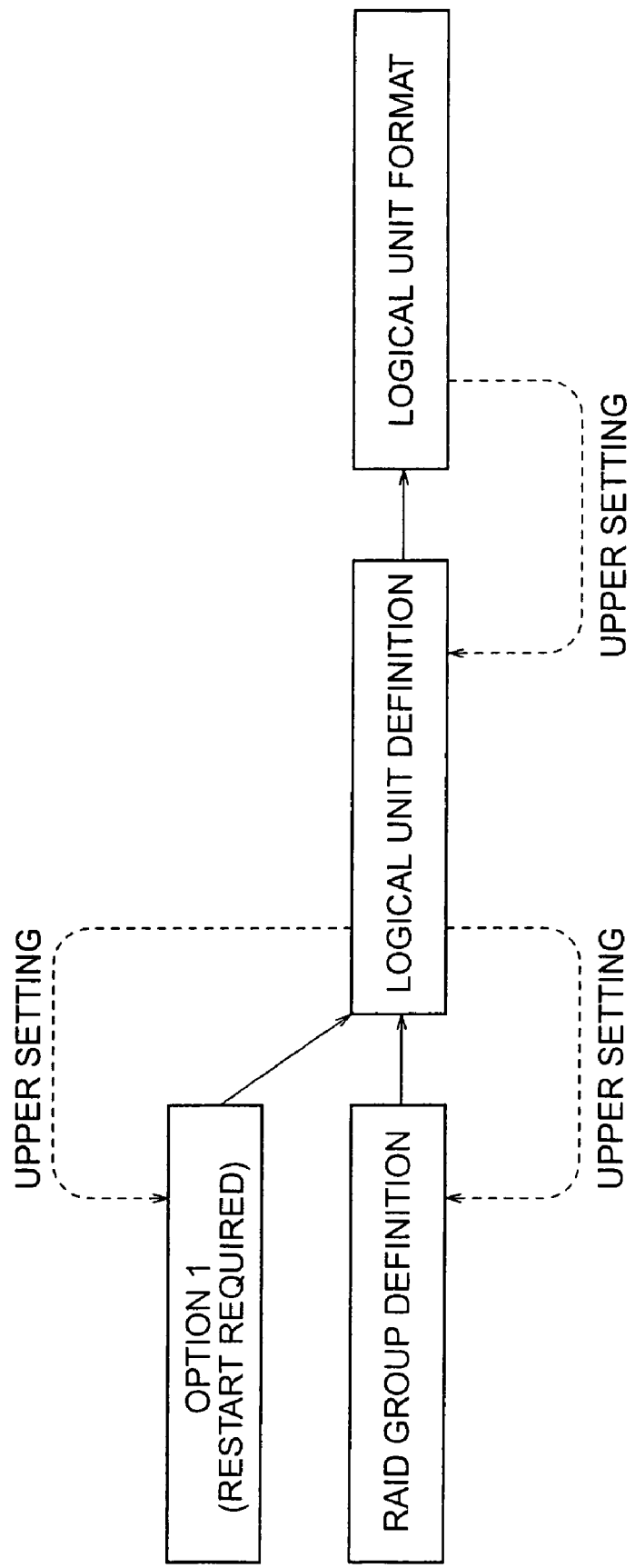
FIG. 5 is a diagram showing a relationship of dependence of upper setting instructions in the embodiment.

FIG. 5 shows a relationship of dependence of upper setting instructions. The upper setting instruction is a setting instruction to be reflected in the configuration information before a predetermined setting instruction. Description will be given in detail of the upper setting instruction by referring to the example shown in FIG. 5. Three setting instructions for a RAID group definition, a logic unit definition, and a logic unit format are required to be reflected in the configuration information in this order. This means that the setting instruction for the RAID group definition is an upper setting instruction with respect to that for the logic unit definition. The setting instruction for the logical unit definition is an upper setting instruction with respect to that for the logic unit format. An upper setting memory function 317 stores the relationship of upper setting instructions. A setting instruction of "option 1" is used as an upper setting instruction for the logical unit definition. To reflect the setting instruction of "option 1" in the configuration information, the restart of the storage device 10 is required. A restart setting memory function 318 stores the setting instructions requiring the restart.

Figure 6:
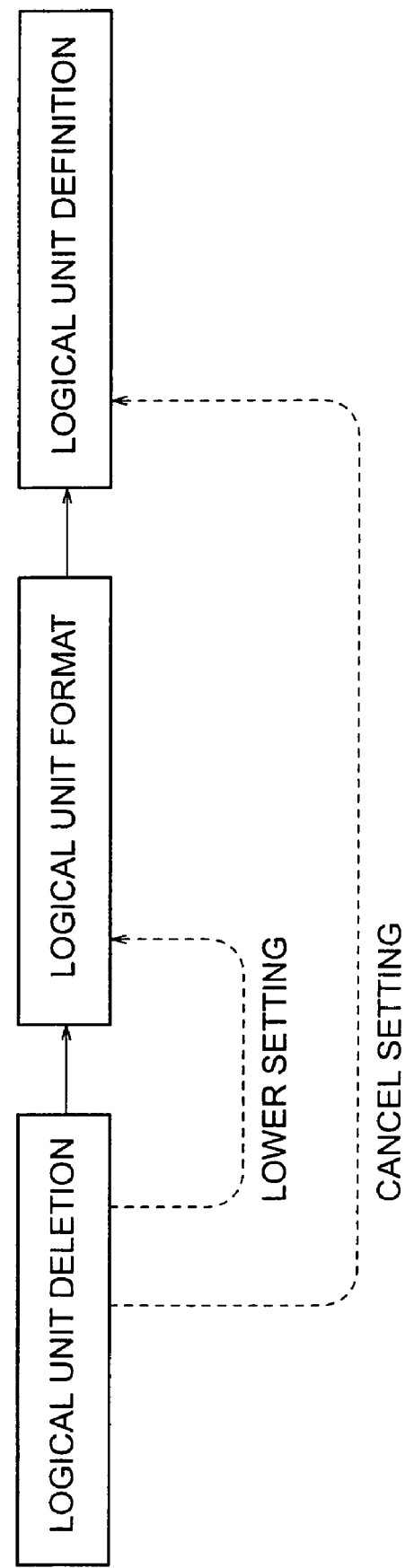
FIG. 6 is a diagram showing a relationship of dependence of lower setting instructions and cancel setting instructions in the embodiment.

FIG. 6 shows a relationship of dependence of lower setting instructions and cancel setting instructions. The lower setting instruction is a setting instruction which is not required to be reflected in the configuration information by reflecting a predetermined setting instruction therein. Description will be given in detail of the lower setting instruction by referring to FIG. 6. Assume that after a logic unit is formatted, the logical unit is deleted. Since the logical unit is deleted in this case, the preceding operation to format the logical unit can be avoided. That is, the setting instruction of the logical unit format is a lower setting instruction with respect to the setting instruction of the logical unit deletion. A lower setting memory function 315 stores the relationship of the lower setting instructions. Assume that the setting instruction of the logical unit deletion and that of the logical unit definition are specified. By executing these setting instructions, it can be assumed that the logical unit is absent in this situation. In other words, executing the setting instructions is substantially equal to executing nothing. When setting instructions have the relationship described above, the setting instruction of the logical unit definition is called a cancel setting instruction for the setting instruction of the logical unit deletion. A cancel setting memory function 316 stores the relationship of cancel setting instructions.

FIG. 7 shows collected setting instructions obtained by collecting the setting instructions of FIG. 4 in consideration of the dependence relationship between the setting instructions. When processing the setting instructions of option 1 and option 2 each of which requires the restart, these setting instructions are first reflected in the configuration information and then the restart is only once conducted. Therefore, information of the restart is deleted in the setting instruction of option 1. The setting instructions of the logical unit definitions are collected into one setting instruction. The setting instructions of the logical unit formatting operations are similarly collected into one setting instruction. In the processing of the logical unit specified as LUN=13, the logical unit is deleted. Therefore, the setting instruction of the logical unit format as a lower setting instruction with respect to the setting instruction of the logical unit deletion is deleted. The setting definition of the logical unit definition as a cancel setting instruction for the logical unit deletion is also deleted.

Operation of Information Processor

Next, description will be given of the operation of the information processor 50 by referring to a flowchart.

Figure 8:
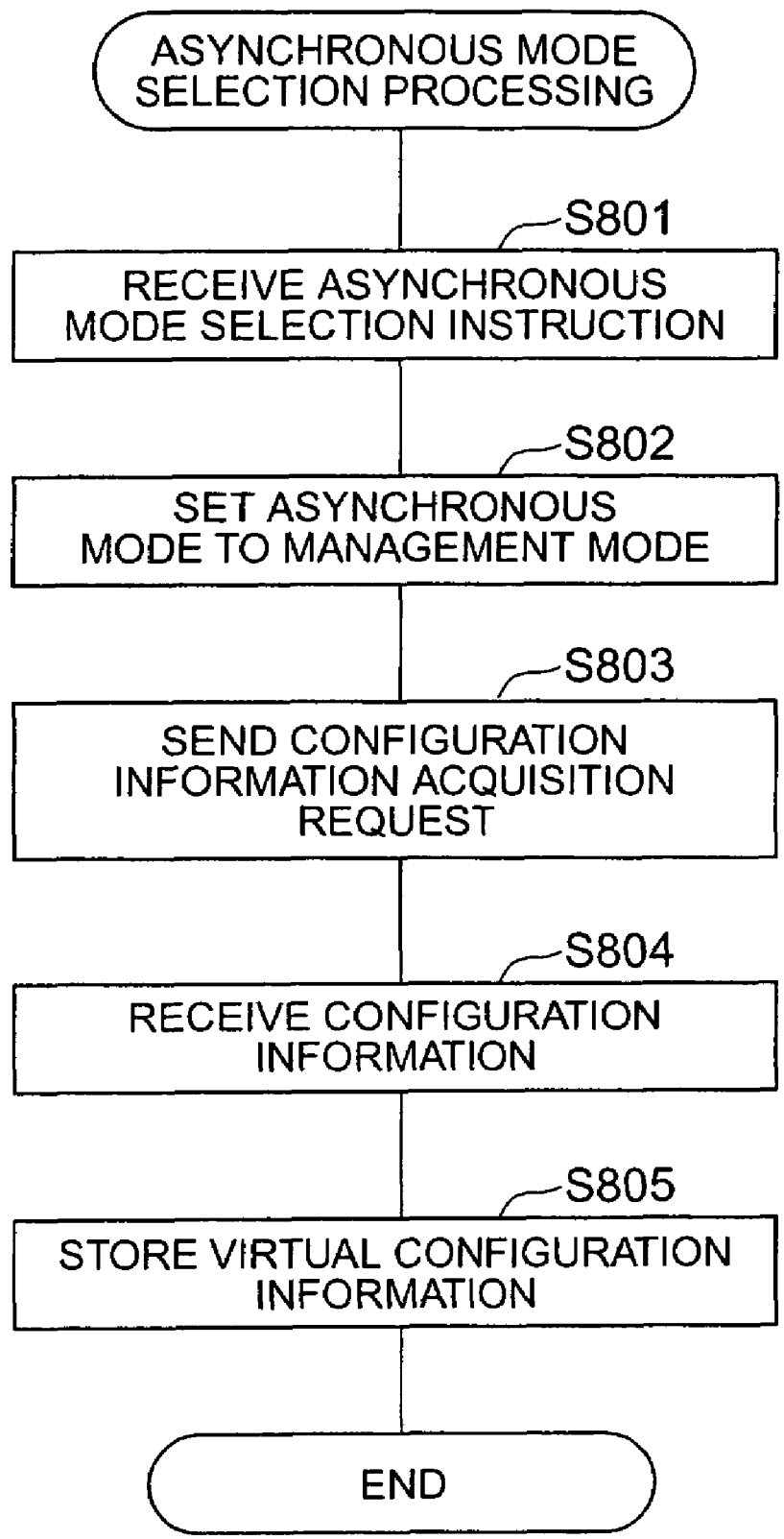
FIG. 8 is a flowchart of processing to select a management mode into an asynchronous mode in the embodiment.

FIG. 8 is a flowchart of operation to select the management mode to the asynchronous mode. First, a first management mode selection instruction receiving function 311 receives from the input unit 56 an instruction to select the management mode to the asynchronous mode (S801). A management mode memory unit 301 stores an event that the management mode is the asynchronous mode (S802). A configuration information acquisition request transmitting function 313 sends to the storage device 10 a request to acquire configuration information (S803). A configuration information receiving unit 314 receives configuration information sent from the storage device 10 in response to the acquisition request (S804). The virtual configuration information memory function 302 stores virtual configuration information including the configuration information received by the receiving function 314 (S805). This completes the processing to select the management mode to the asynchronous mode.

Figure 9:
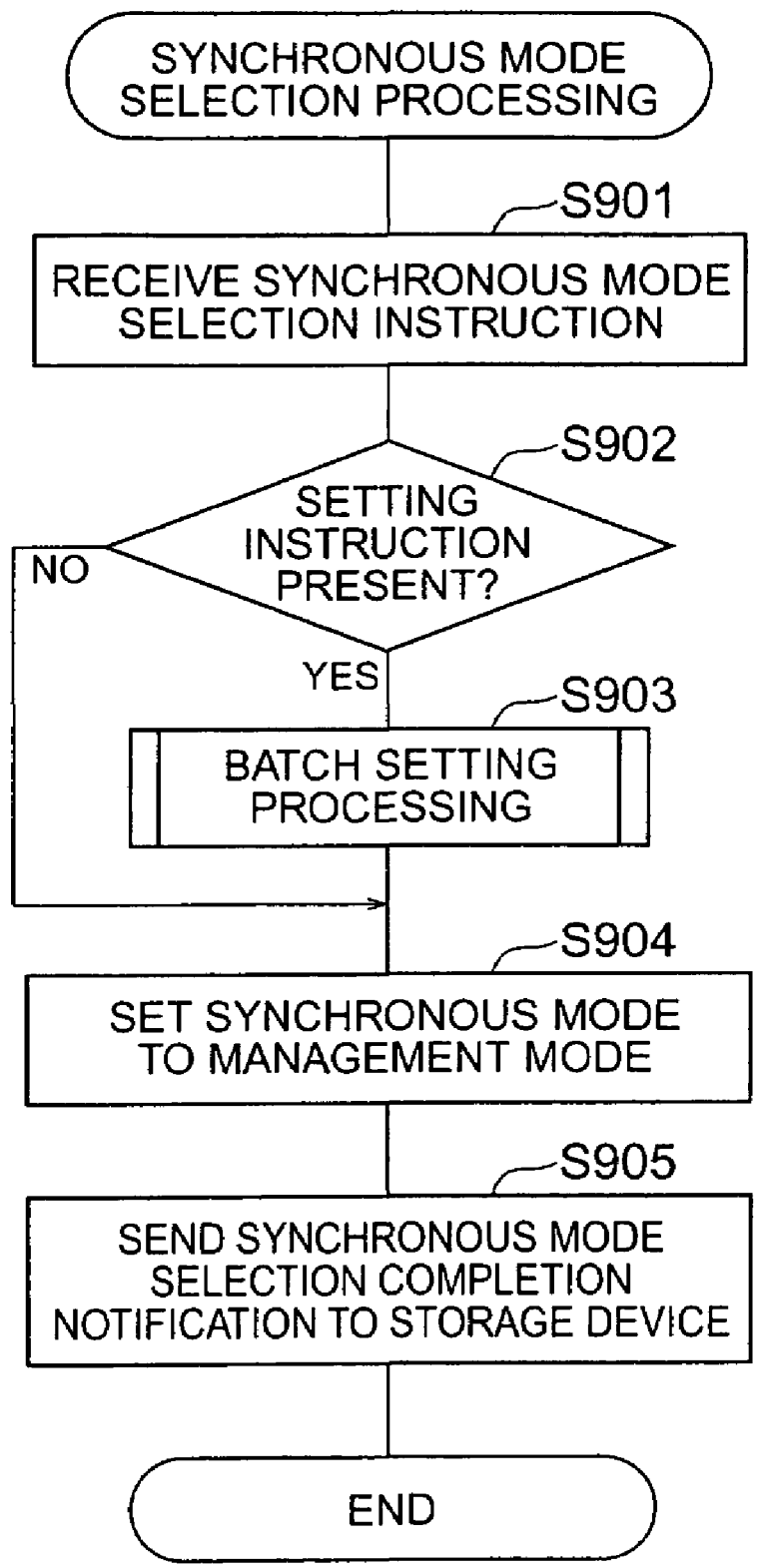
FIG. 9 is a flowchart of processing to select a management mode into a synchronous mode in the embodiment.

FIG. 9 is a flowchart of operation to select the management mode to the synchronous mode. A second management mode selection instruction receiver 312 receives from the input unit 56 an instruction to change the management mode to the synchronous mode (S901). The setting instruction transmitting function 304 makes a check to confirm whether or not the setting instruction memory unit 303 has stored a setting instruction (S902). If this is the case, collective setting processing (S903) is executed.

The management mode memory unit 301 then stores an event that the management mode is the synchronous mode (S904). The setting instruction transmitting function 304 sends a notification of completion of the operation of selecting the management mode to the synchronous mode to the storage device 10 (S905). The notification is transmitted for exclusive control, which will be described later.

Figure 10:
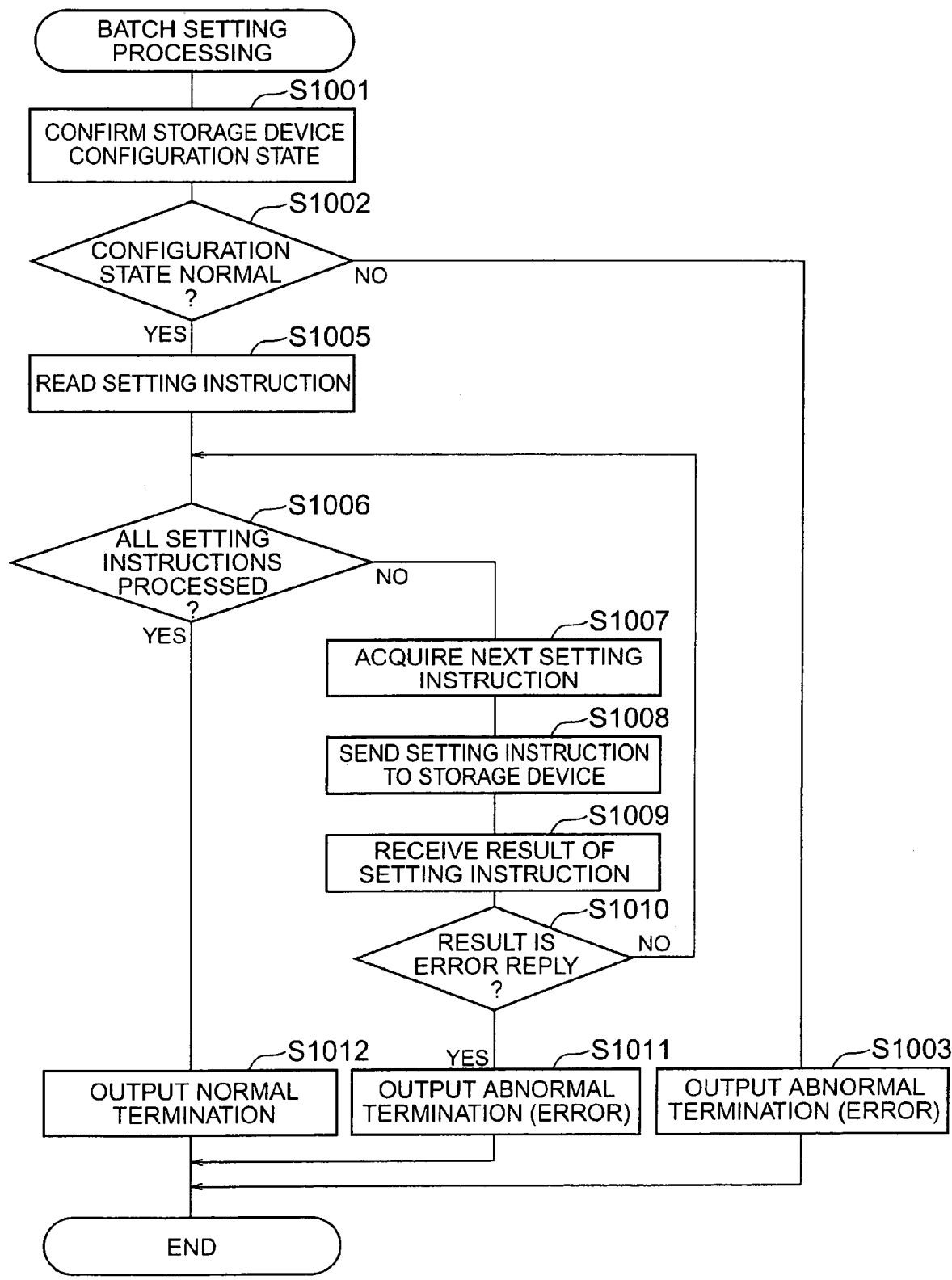
FIG. 10 is a flowchart of processing to transmit a setting instruction to a storage device in the embodiment.

FIG. 10 is a flowchart showing details of the collective setting processing. First, the setting instruction transmitting function 306 sends a request to confirm a configuration state to the storage device 10 (S1001). This request is issued to determine whether or not hardware failure has occurred in the storage device 10. On receiving a result of the request from the storage device 10, the transmitting function 306 makes a check to confirm whether or not the configuration state is normal (S1002).

If the configuration state is abnormal, the transmitting function 306 sends to the output unit 57 a notification that the setting instruction cannot be transmitted due to an abnormality in the configuration information of the storage device 10 (S1003). When the configuration state is abnormal, the transmitting function 306 makes a check to confirm whether or not the setting instruction stored in the memory unit 303 affects a failed position associated with the hardware failure. If this is the case, the transmitting function 306 may send the setting instruction affecting the failed position to the output unit 57. When information of the setting instruction to be deleted is received from the input unit 56, it is also possible that the setting instruction transmitting function 306 deletes the setting instruction and executes subsequent processing (beginning at step S1005).

If the configuration state is normal, the transmitting function 306 reads a setting instruction from the memory function 303 (S1005). The transmitting function 306 repeatedly executes processing to send the setting instruction to the storage device 10 according to the sequence of the setting instructions (S1006 to S1008). If any setting instruction includes the restart information, the transmitting function 306 sends the setting instruction to the storage device 10 and then transmits an instruction of a restart to the storage device 10 before sending a subsequent setting instruction to the storage device 10. When a result of each setting instruction is received from the storage device 10 (S1009), the transmitting function 306 makes a check to determine whether or not the result indicates an error (S1010). If an error has occurred for the setting instruction, the transmitting function 306 interrupts a sequence of the setting instruction (S1006 to S1008) and transmits detailed information of the error to the output unit 57 (S1011). If all setting instructions are normally processed, the transmitting function 306 sends an event of normal termination of all setting instructions to the output device (S1012).

Figure 11:
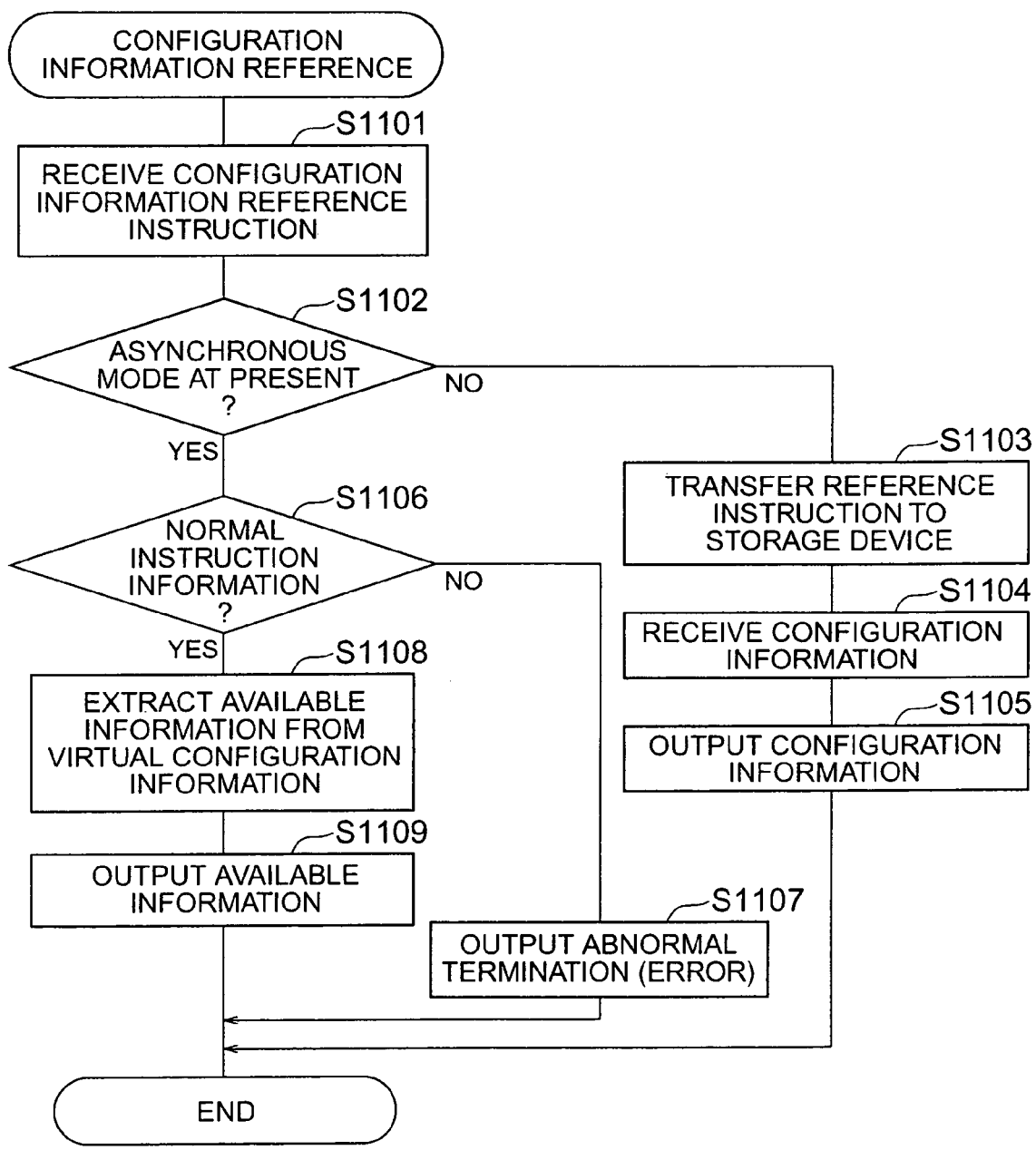
FIG. 11 is a flowchart of processing to refer to configuration information in the embodiment.

FIG. 11 shows in a flowchart an operation conducted at reception of a reference instruction to refer to configuration information. First, a reference instruction receiving function 308 receives a configu-ration information reference instruction from the input unit 56 (S1101). The receiving function 308 then refers to the management mode in the management mode memory unit 301 to confirm whether or not the current management mode is the asynchronous mode (S1102).

If the current management mode is the synchronous mode, a transfer section 310 transfers the configuration information reference instruction to the storage device 10 (S1103). When configuration information is received from the storage device 10 (S1104), the transfer section 310 delivers the configuration information to the output unit 57 (S1105).

If the current management mode is the asynchronous mode, a virtual configuration information output unit 309 makes a check to determine whether or not the reference instruction is appropriate for the virtual configuration information in the memory function 302 (S1106). If information of the reference instruction is abnormal, the output section 309 notifies an event of an abnormality thereof to the output unit 57 (S1107). If the information of the instruction is normal, the output function 309 obtains configuration information associated with the reference instruction from the virtual configuration information stored in the memory function 302 (S1108) and then delivers the configuration information to the output unit 57 (S1109).

Figure 12:
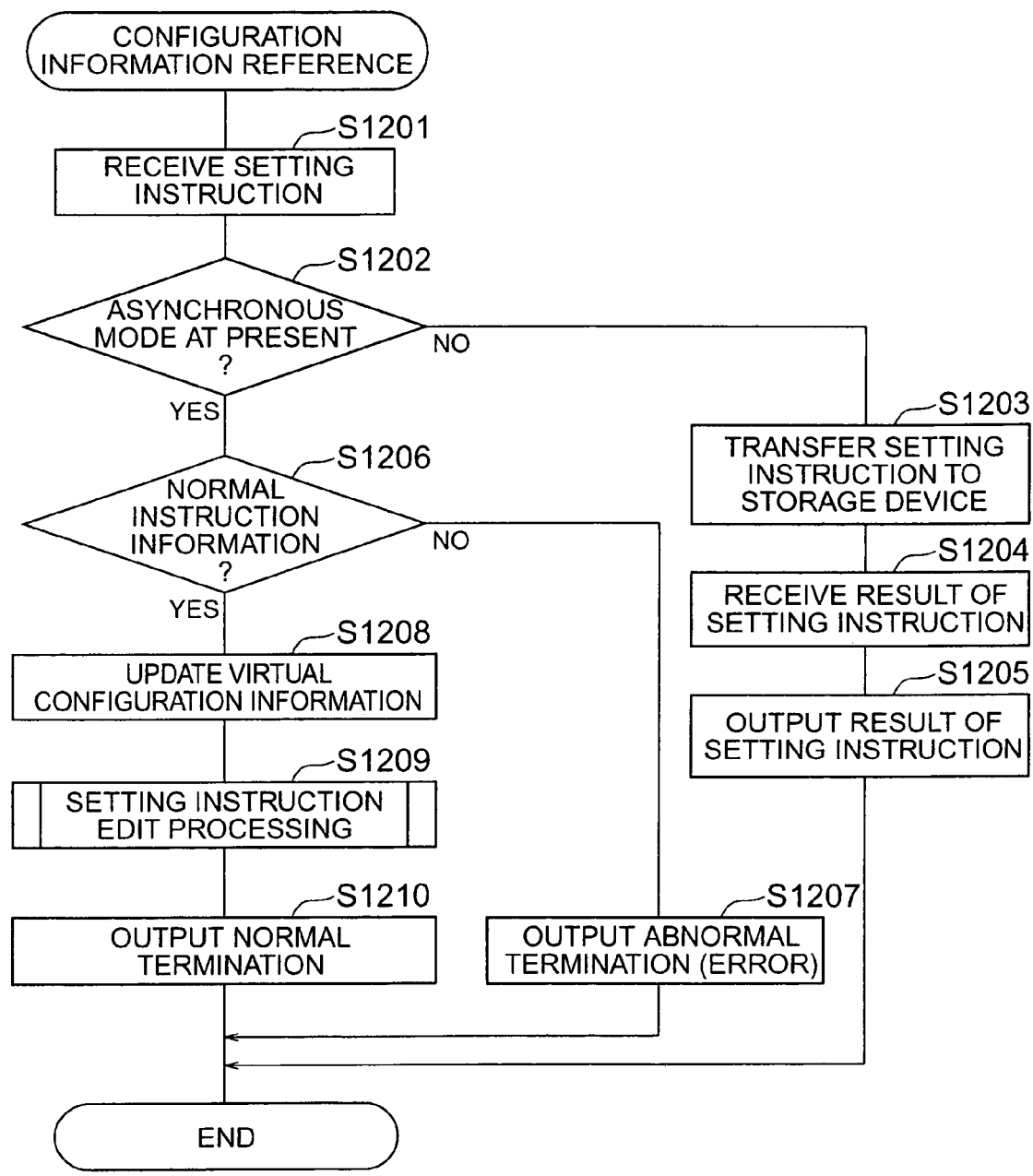
FIG. 12 is a flowchart of processing to set configuration information in the embodiment.

According to the information confirmed in the configuration information reference processing shown in FIG. 11, the manager inputs a setting instruction of configuration information from the input unit 56. FIG. 12 is a flowchart of operation at reception of a setting instruction of configuration information. The setting instruction receiving function 304 first receives a configuration information setting instruction from the input unit 56 (S1201). The receiving function 304 refers to the management mode in the management mode memory function 301 to determine whether or not the present management mode is the asynchronous mode (S1202).

If the management mode is the synchronous mode, the setting instruction transfer function 307 transfers the setting instruction to the storage device 10 (S1203). When a result of the setting instruction is received from the storage device 10 (S1204), the transfer function 307 delivers the result to the output unit 57 (S1205).

If the management mode is the asynchronous mode, the virtual configuration information update function 305 makes a check to determine whether or not the setting instruction is appropriate for the virtual configuration information in the virtual configuration information memory function 302 (S1206). If information of the setting instruction is abnormal, the update function 305 notifies an event of an abnormality of the setting instruction to the output unit 57 (S1207). If the information of the instruction is normal, the update function 305 updates, according to the setting instruction, the virtual configuration information stored in the memory function 302 (S1208). The setting instruction memory function 303 then executes edit processing to store the setting instruction (S1209). When the edit processing is terminated, the update function 305 notifies a normal termination of the processing to set the configuration information to the output unit 57 (S1210).

Figure 13:
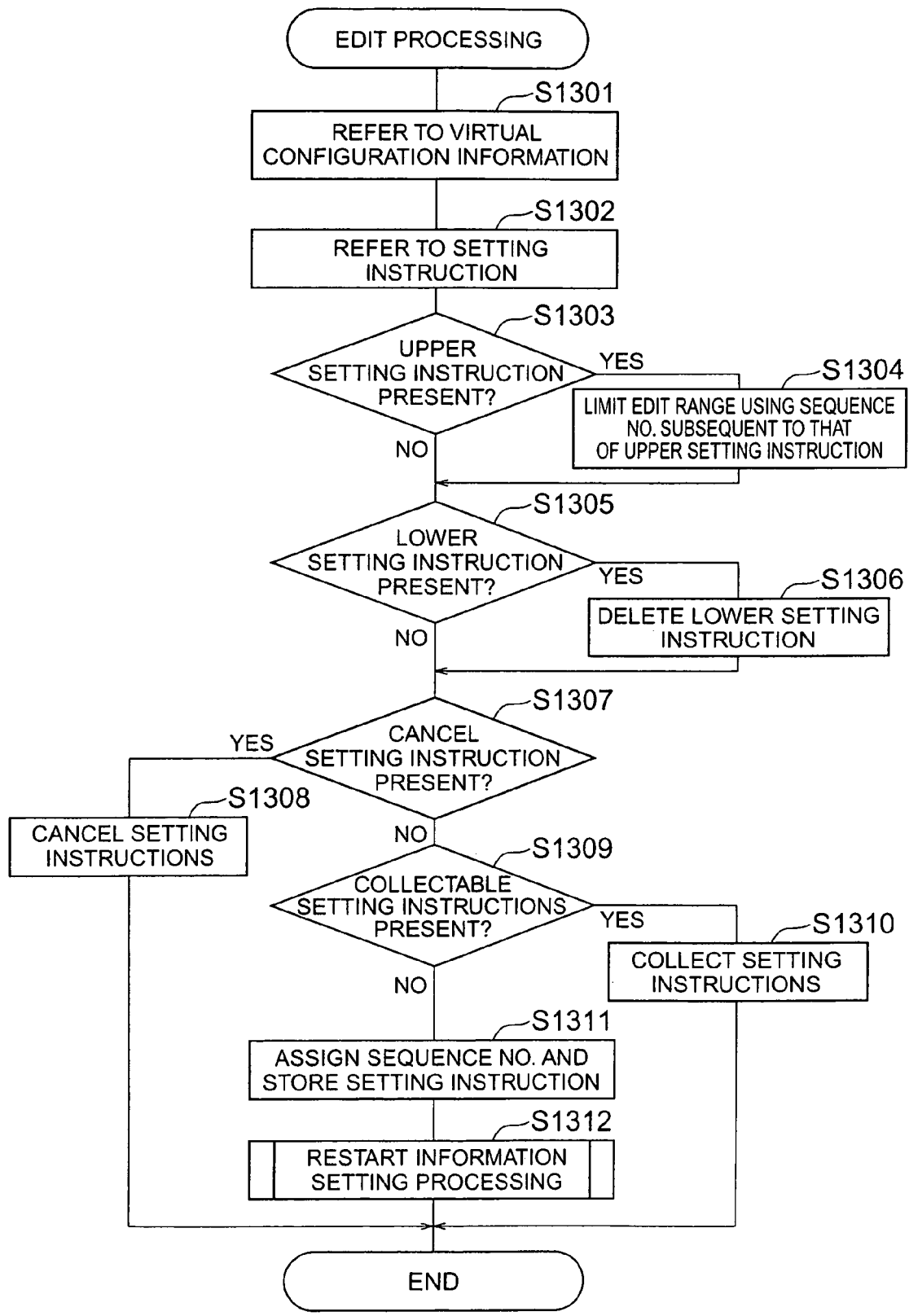
FIG. 13 is a flowchart of processing to edit a setting instruction in the embodiment.

FIG. 13 shows the operation of the edit processing (S1209) in a flowchart. The setting instruction memory function 303 refers to virtual configuration information in the memory unit 302 and setting instructions in the memory unit 303 (S1301 and S1302).

The memory unit 303 then makes a check to determine whether or not an upper setting instruction has already been stored for a setting instruction as an object of the edit processing (S1303). If such an upper setting instruction is present, the memory function 303 stores the sequence number of the setting instruction. The stored information is used in an operation to collect setting instructions, which will be described later. The information is specifically used to limit a range of collection of setting instructions such that the range begins at the sequence number of the upper setting instruction (S1304).

The memory unit 303 makes a check to confirm whether or not a lower setting instruction for the setting instruction has already been stored (S1305). If this is the case, the memory function 303 deletes the lower setting instruction (S1306). The memory function 303 makes a check to determine whether or not a cancel setting instruction for the setting instruction has already been stored (S1307).

If such a cancel setting instruction is present, the memory function 303 deletes the cancel setting instruction and terminates the edit processing without storing the setting instruction (S1308).

If the cancel setting instruction is absent, the memory unit 303 makes a check to determine whether or not a collectable setting instruction having a command equal to that of the pertinent setting instruction has already been stored (S1309). If such a collectable setting instruction is present, the memory function 303 adds a parameter of the pertinent setting instruction to the collectable setting instruction and stores the collectable setting instruction to thereby terminate the edit processing (S1310). In the judgement of presence or absence of a collectable setting instruction, the memory function 303 executes the processing only for a collectable setting instruction with a sequence number subsequent to the sequence number of the upper setting instruction described above.

If a collectable setting instruction is absent, the memory function 303 assigns to the pertinent setting instruction a sequence number subsequent to the last sequence number of the setting instructions stored therein and stores the setting instruction (S1311). The memory function 303 then executes setting processing to set restart information to the setting instruction (S1312) and terminates the edit processing.

Figure 14:
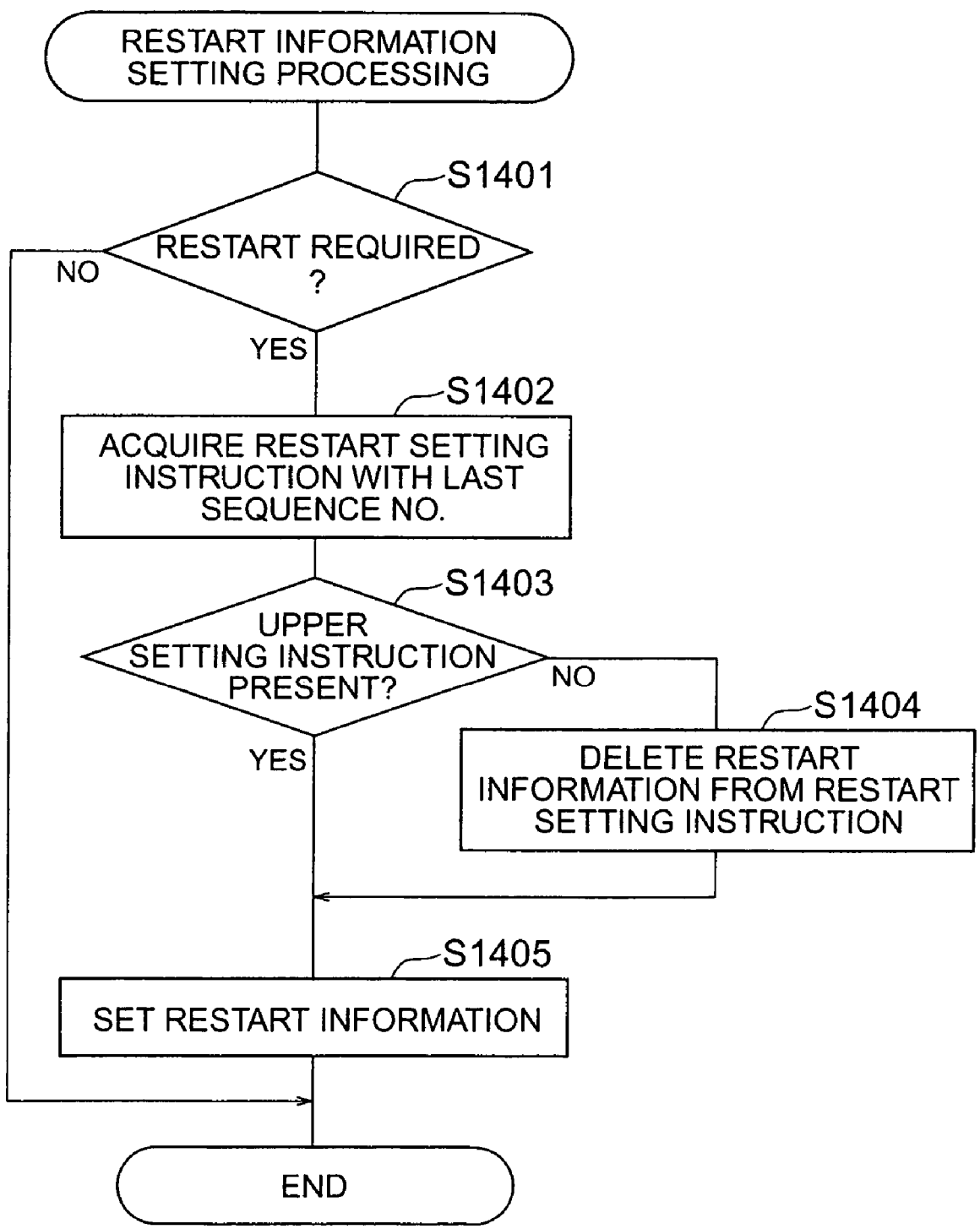
FIG. 14 is a flowchart of processing to set restart information to a setting instruction in the embodiment.

FIG. 14 is a flowchart of operation of the restart information setting processing (S1312). The setting instruction memory function 303 refers to the restart setting memory function 318 to determine whether or not the setting instruction is a restart setting instruction (S1401). If the instruction is a restart setting instruction, the memory function 303 accesses the setting instructions specified with restart information therein to acquire one restart setting instruction having a last sequence number (S1402). The memory function 303 then makes a check to confirm whether or not a setting instruction which has a sequence number subsequent to that of the restart setting instruction and for which the restart setting instruction is an upper setting instruction has been stored (S1403).

If such a setting instruction is absent, the memory function 303 deletes the restart information of the restart setting instruction (S1404). The memory function 202 sets the restart information to the setting instruction stored in step S1311 (S1405) and terminates the processing.

If a setting instruction satisfying the condition is present, the memory function 303 does not delete the restart information. This is because the restart of the storage device 10 is required after the restart setting instruction is sent to the storage device 10.

Exclusive Control

Next, description will be given of exclusive control conducted by the storage device 10 for the information processor 50.

Figure 15:
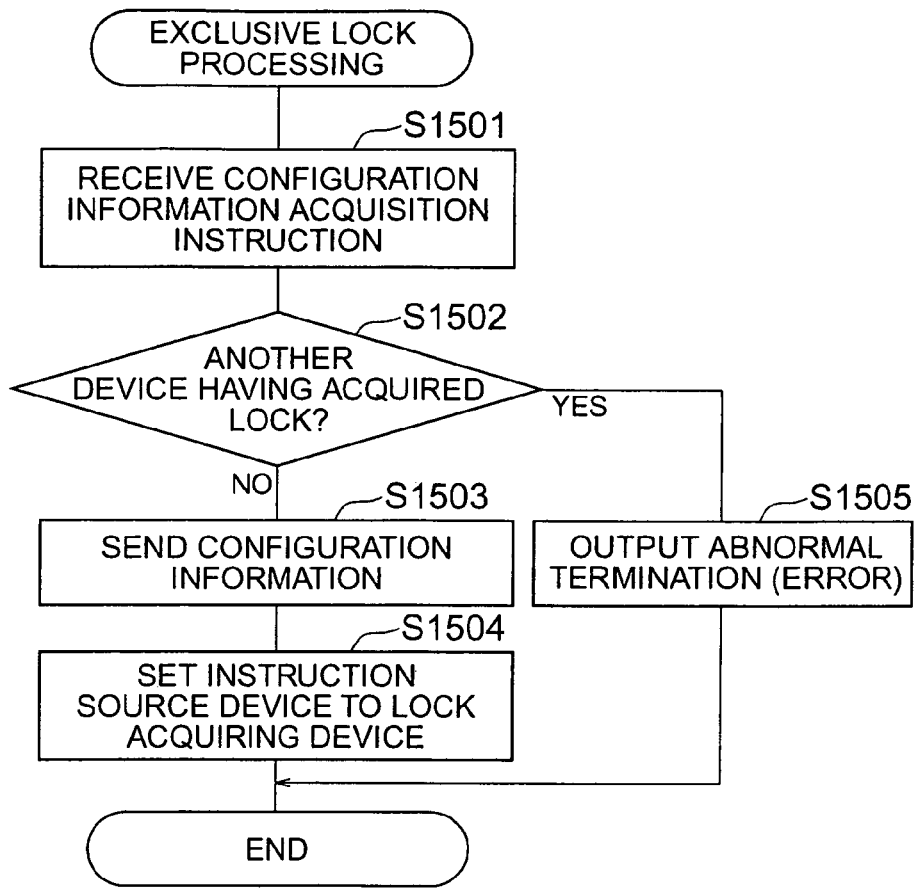
FIG. 15 is a flowchart of processing of exclusive lock processing executed by the storage device in the embodiment.

FIG. 15 shows operation of the exclusive lock processing executed by the storage device 10. The storage device 10 receives a configuration information acquisition instruction from the information processor 50 (S1501). The storage device 10 makes a check to determine whether or not a lock file 81 is existing, namely, another information processor 50 has already acquired "lock" (S1502).

If the lock file is absent, the storage device 10 transmits configuration information to the information processor 50 (S1503) and generates a lock file 81 including an address of the information processor 50 (S1504).

If the lock file is present, the storage device 10 notifies to the information processor 50 an event that another information processor 50 is updating the configuration information (S1505).

Figure 16:
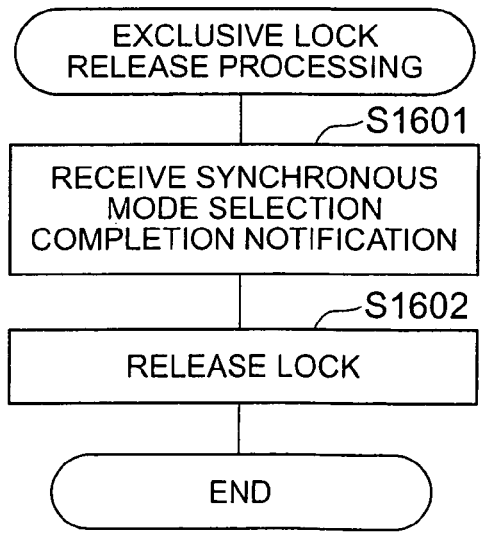
FIG. 16 is a flowchart of processing of the storage device to release the exclusive lock in the embodiment.

FIG. 16 is a flowchart showing an operation of the storage device 10 to release the exclusive lock. When a synchronous mode selection completion notification is received from the information processor 50 (S1601), the storage device 10 deletes the lock file 81 (S1602).

Figure 17:
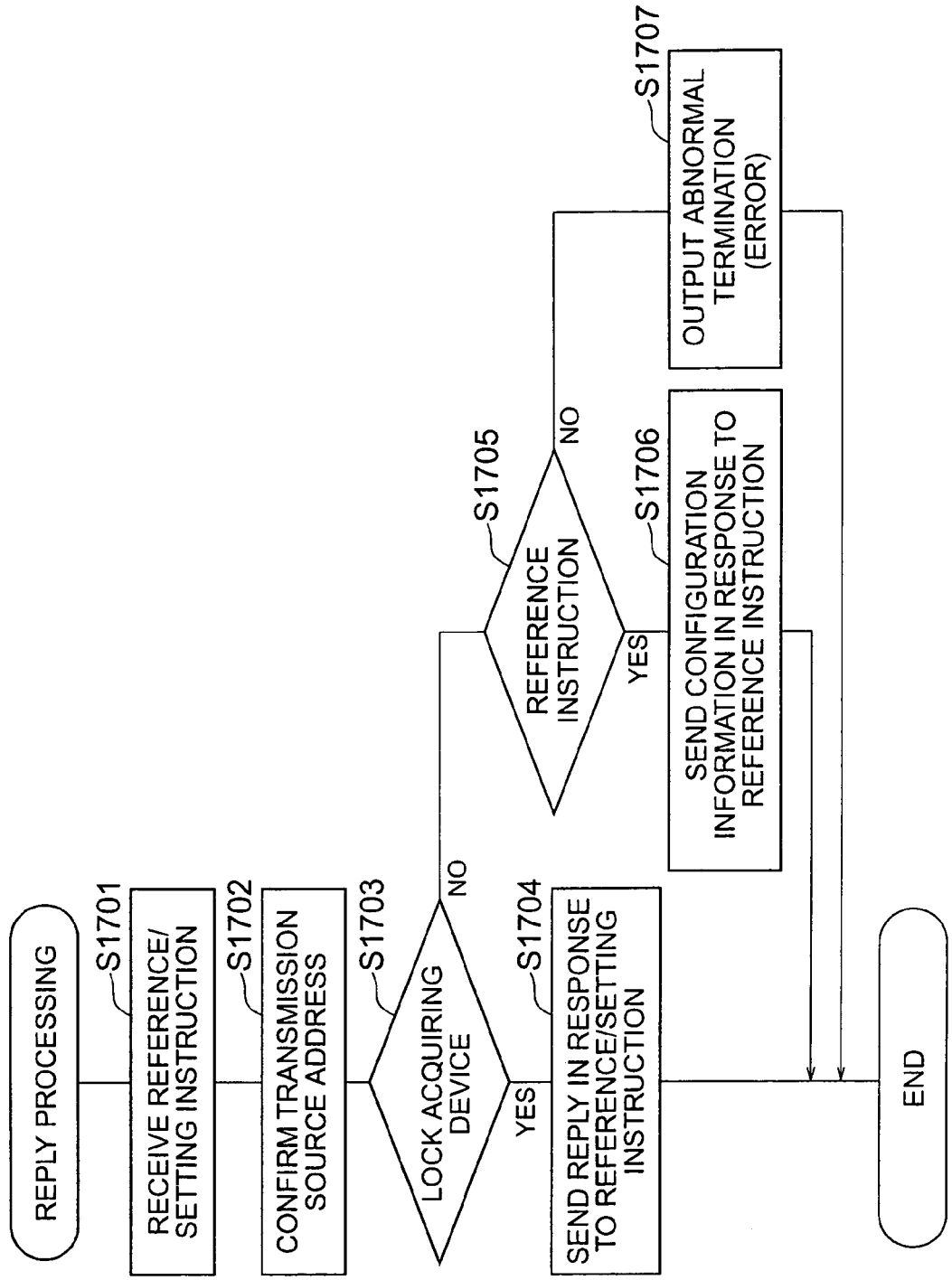
FIG. 17 is a flowchart of operation conducted when the storage device receives a reference instruction or a setting instruction for the configuration information in the embodiment.

FIG. 17 is a flowchart of operation conducted by the storage device 10 at reception of a reference instruction or a setting instruction for the configuration information. The storage device 10 receives a reference instruction or a setting instruction for the configuration information from the information processor 50 (S1701). The storage device 10 confirms an address of the information processor 50 as a transmission source (S1702). The storage device 10 makes a check to determine whether or not the address of the information processor 50 exists in the lock file 81 (S1703).

If the address is present in the lock file 81, the storage device 10 executes processing of the reference or setting instruction and sends a result of the processing to the information processor 50 (S1704).

If the address has not been set to the lock file 81, the storage device 10 makes a check to determine whether or not the instruction is a reference instruction (S1705). If this is the case, the storage device 10 sends configuration information corresponding to the reference instruction to the information processor 50 (S1706). If the instruction is a setting instruction, the storage device 10 notifies an event that another information processor 50 is updating the configuration information and hence the setting instruction cannot be executed for the configuration information (S1707).

In the embodiment, a lock file 81 is employed to conduct the exclusive control of the information processor 50. However, any item other than a file may be used only if the item can control information of the information processor 50 which is updating the configuration information.

Description has been given of the operations of the information processor 50 and the storage device 10.

As above, since the configuration information of the storage device 10 can be set in the asynchronous mode, it is possible to reduce the wait time required for the manager to set a large number of items to the configuration information of the storage device 10.

In the synchronous mode, the setting instruction inputted by the manager is immediately delivered to the storage device 10 to update the configuration information of the storage device 10. That is, when the configuration information is to be immediately updated in, for example, an urgent situation, the manager can immediately update the configuration information by use of the synchronous mode.

When the management mode is the asynchronous mode, the manager can issue a selection instruction to set the management mode to the synchronous mode such that the setting instruction stored in the setting instruction memory unit 303 is sent to the storage device 10 to resultantly update the configuration instruction. That is, the manager can control timing of updating the configuration instruction of the storage device 10. It may also possible that the setting instruction transmitting unit 306 sends the setting instruction stored in the setting instruction memory function 303 to the storage device 10 at desired timing, not in response to the management mode selection instruction.

The memory function 303 stores the setting instructions with a correspondence established between the setting instructions and the reception sequence thereof. Consequently, the transmitting function 306 can send the setting instructions of which the setting sequence is determined to the storage device according to the setting sequence.

When the management mode is the asynchronous mode, the response time of a configuration information reference instruction can be reduced by referring to the configuration information by use of the virtual configuration information stored in the virtual configuration information memory function 302. It is not required for the storage device 10 to execute any reply processing in response to the reference instruction. Therefore, the configuration information can be referred to without imposing any additional processing load on the storage device 10.

When it is desired to refer to actual configuration information of the storage device 10, the manager can refer to the configuration information by using the synchronous mode.

The setting instruction memory function 303 deletes particular setting instructions therefrom by discriminatively confirming the lower setting instruction, the cancel setting information, and the collectable setting instruction from each other. This resultantly reduces the period of time required to transmit a setting instruction and the processing time required to process the setting instructions in the storage device 10. That is, the processing load of the storage device 10 and traffic on the communication network can be reduced.

By checking an upper setting instruction, the setting instruction memory function 303 can collect setting instructions without any conflict of a setting sequence error.

The setting instruction memory function 303 stores a setting instruction including restart information. Therefore, the setting instruction transmitting function 307 can correctly reflect any setting instruction requiring the restart of the storage device 10 in the configuration information of the storage device 10. By deleting the restart information, the number of restart operations of the storage device 10 is reduced. This also reduces the period of time required to reflect setting instruction information 94 in the configuration information.

In a situation in which a plurality of information processing apparatuses 50 update the configuration information, the storage device 10 can exclusively control the information processing apparatuses 50. There possibly exists a case in which the storage device 10 stores data of a plurality of information processing systems, a manager exists for each information processing system, and an information processing apparatus 50 is disposed for each manager. In this case, the storage device 10 uses a lock file 81 to conduct exclusive control. Specifically, while an information processing apparatus 50 is updating the configuration information in the asynchronous mode, the storage device 10 prevents an operation in which any other information processing apparatus 50 updates the configuration information of the storage device 10 in the asynchronous or synchronous mode.

Other Embodiments

Figure 18:
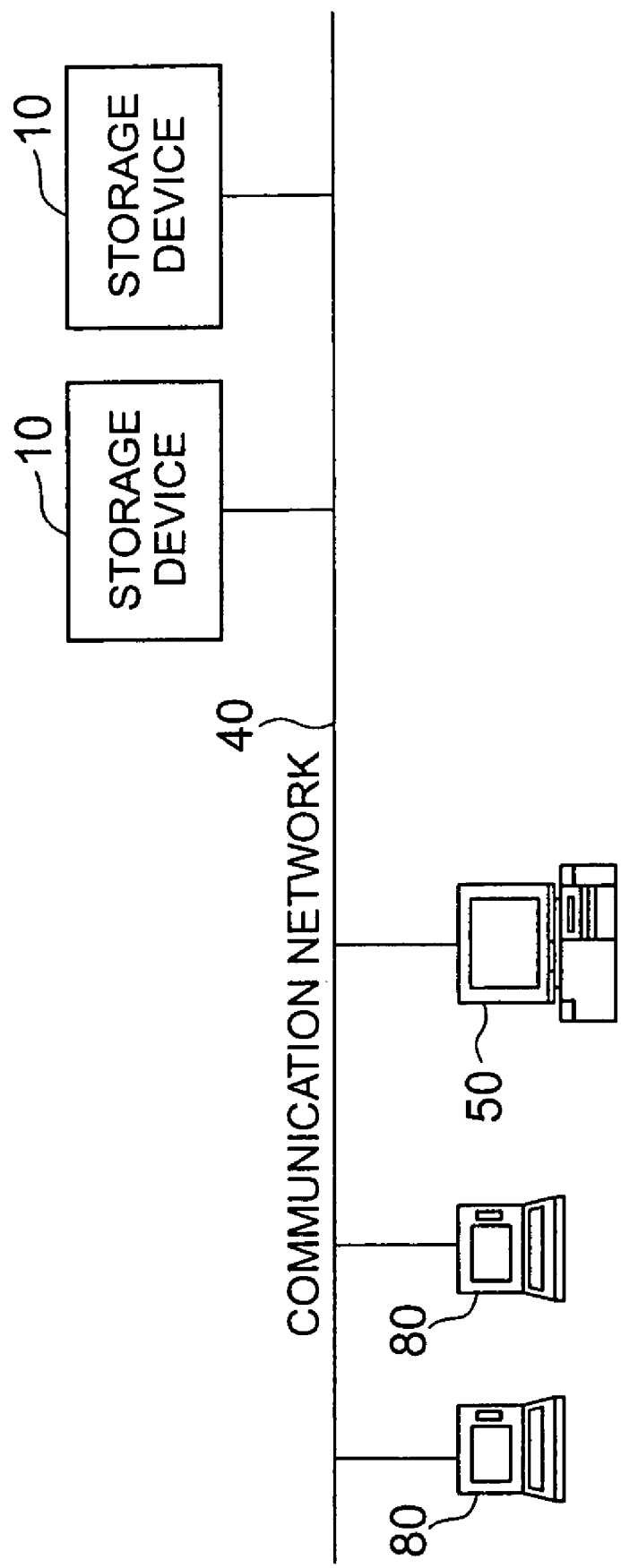
FIG. 18 is a schematic diagram showing an operation when a reference instruction and a setting instruction for the configuration information are inputted from a client computer communicably connected to the information processing apparatus in the embodiment.

In the embodiment, a setting instruction and a reference instruction for the configuration information are supplied from the input unit 56 of the information processor 50 and a result of the associated processing is delivered to the output unit 57. However, the input unit and the output unit may be disposed as external devices of the information processor 50. For example, client computers 80 may be disposed to be communicably connected to the information processor 50 as shown in FIG. 18. Each client computer 80 is an information processor including an input unit such as a mouse or a keyboard and an output unit such as a display or a printer. In this configuration, the setting instruction and the reference instruction for the configuration information are inputted from the input unit of the client computer 80 and are sent to the information processor 50 as a server. The information processor 50 executes processing for the setting instruction and the reference instruction and results of the associated processing are delivered to the output unit of the client computer 80.

As can be seen from FIG. 18, the information processor 50 may control the configuration information of a plurality of storage devices 10. In this case, the management mode memory function 301, the virtual configuration information memory function 302, and the setting instruction memory function 303 stores information items each of which is associated with an identifier of an associated storage device 10. Each of the setting instruction and the reference instruction for the configuration information includes an identifier of the associated storage device 10. According to the identifier, the management mode and the virtual configuration information are referred to and are set. The setting instruction memory function 303 stores the setting instructions each of which is associated with the identifier.

Description has been given of embodiments of the present invention only to facilitate understanding of the present invention, and hence the present invention is not restricted by the embodiments. The present invention is intended to cover various modifications and equivalent arrangements included within the spirit and scope of the claims.

What is claimed is:

1. A control method of controlling an information processing apparatus communicably connected to a storage device, the apparatus including a memory, and an input unit, the memory storing, as virtual configuration information, configuration information including setting information of hard disk drives of the storage device, the memory storing information indicating whether a management mode as a control method of the configuration information is a first mode or a second mode, the control method comprising the steps of:

receiving a setting instruction of the configuration information from the input unit;

updating, when information in the memory indicates that the management mode is the first mode, the virtual configuration information in the memory according to the setting instruction;

storing the setting instruction to update the virtual configuration information into the memory;

transmitting the setting instruction from the memory to the storage device;

transferring, when information in the memory indicates that the management mode is the second mode, the setting instruction to the storage device;

receiving a first management mode selection instruction to select the management mode to the first mode from the input unit;

transmitting, when the first management mode selection instruction is received, an acquisition request to acquire the configuration information to a device;

receiving the configuration information transmitted from the device in response to the acquisition request;

storing, when the first management mode selection instruction is received, information indicating that the management mode is the first mode into the memory; and storing the configuration information received from the device into the memory, the configuration information being stored as the virtual configuration information.

2. A control method of controlling an information processing apparatus communicably connected to a storage device, the apparatus including a memory, and an input unit, the memory storing, as virtual configuration information, configuration information including setting information of hard disk drives of the storage device, the memory storing information indicating whether a management mode as a control method of the configuration information is a first mode or a second mode, the control method comprising the steps of:

receiving a setting instruction of the configuration information from the input unit;

updating, when information in the memory indicates that the management mode is the first mode, the virtual configuration information in the memory according to the setting instruction;

storing the setting instruction to update the virtual configuration information into the memory;

transmitting the setting instruction from the memory to the storage device;

transferring, when information in the memory indicates that the management mode is the second mode, the setting instruction to the storage device;

storing a correspondence between the setting instruction and a lower setting instruction into the memory, the lower setting instruction being a setting instruction not required to be reflected in the configuration information when the setting instruction is reflected in the configuration information; and deleting the lower setting instruction when the memory stores the lower setting instruction corresponding to the setting instruction.

3. A control method of controlling an information processing apparatus communicably connected to a storage device, the apparatus including a memory, and an input unit, the memory storing, as virtual configuration information, configuration information including setting information of hard disk drives of the storage device, the memory storing information indicating whether a management mode as a control method of the configuration information is a first mode or a second mode, the control method comprising the steps of:

receiving a setting instruction of the configuration information from the input unit;

updating, when information in the memory indicates that the management mode is the first mode, the virtual configuration information in the memory according to the setting instruction;

storing the setting instruction to update the virtual configuration information into the memory;

transmitting the setting instruction from the memory to the storage device;

transferring, when information in the memory indicates that the management mode is the second mode, the setting instruction to the storage device; and storing a correspondence between the setting instruction and a cancel setting instruction into the memory, the cancel setting instruction being a setting instruction which creates first configuration information when the cancel setting instruction is reflected in the configuration information together with the setting instruction and which creates second configuration information substantially equal to the first configuration information when the cancel setting instruction is not reflected in the configuration information together with the setting instruction, wherein the step of storing the setting instruction into the memory is the step of deleting the cancel setting instruction without storing the setting instruction into the memory when the memory stores the cancel setting instruction corresponding to the setting instruction.

4. A control method of controlling an information processing apparatus communicably connected to a storage device, the apparatus including a memory, and an input unit, the memory storing, as virtual configuration information, configuration information including setting information of hard disk drives of the storage device, the memory storing information indicating whether a management mode as a control method of the configuration information is a first mode or a second mode, the control method comprising the steps of:

receiving a setting instruction of the configuration information from the input unit;

updating, when information in the memory indicates that the management mode is the first mode, the virtual configuration information in the memory according to the setting instruction;

storing the setting instruction to update the virtual configuration information into the memory;

transmitting the setting instruction from the memory to the storage device;

transferring, when information in the memory indicates that the management mode is the second mode, the setting instruction to the storage device;

configuring the setting instruction with a setting instruction command and at least one parameter for the command; and making a check to confirm whether or not the memory stores a collectable setting instruction, the collectable setting instruction including a setting instruction command substantially equal to that of the setting instruction, wherein the step of storing the setting instruction into the memory comprises the step of:

adding, when the memory stores the collectable setting instruction, the parameter of the setting instruction to the collectable setting instruction, without storing the setting instruction into the memory.

5. A control method according to claim 4, further comprising the steps of:

storing a correspondence between the setting instruction and an upper setting instruction into the memory, the upper setting instruction being a setting instruction required to be reflected in the configuration information before the setting instruction; and making a check to confirm, when the memory stores the upper setting instruction corresponding to the setting instruction, whether or not the memory stores the collectable setting instruction later in the sequence than the upper setting instruction, wherein the step of storing the setting instruction into the memory comprises the steps of:

adding the parameter of the setting instruction to the collectable setting instruction without storing the setting instruction when the memory stores the collectable setting instruction later in the sequence than the upper setting instruction, and storing the setting instruction when the memory does not store the collectable setting instruction later in the sequence than the upper setting instruction.

6. A control method of controlling an information processing apparatus communicably connected to a storage device, the apparatus including a memory, and an input unit, the memory storing, as virtual configuration information, configuration information including setting information of hard disk drives of the storage device, the memory storing information indicating whether a management mode as a control method of the configuration information is a first mode or a second mode, the control method comprising the steps of:

receiving a setting instruction of the configuration information from the input unit;

updating, when information in the memory indicates that the management mode is the first mode, the virtual configuration information in the memory according to the setting instruction;

storing the setting instruction to update the virtual configuration information into the memory;

transmitting the setting instruction from the memory to the storage device;

transferring, when information in the memory indicates that the management mode is the second mode, the setting instruction to the storage device; and storing as a restart setting instruction into the memory a setting instruction requiring a restart of the storage device to be reflected in the configuration information, wherein the step of storing the setting instruction into the memory comprises the step of:

storing, when the setting instruction is the restart setting instruction, the setting instruction and restart information indicating requirement of a restart with a correspondence established therebetween, and wherein the step of storing the setting instruction into the storage device comprises the step of:

transmitting, in the transmission of the setting instruction to the storage device, the setting instruction to the storage device and transmitting thereafter an instruction of a restart thereto when the memory stores the restart information corresponding to the setting instruction.

7. A control method according to claim 6, further comprising the steps of:

storing into the memory a correspondence between the setting instruction and an upper setting instruction required to be reflected in the configuration information before the setting instruction;

making a check to confirm, when storing the restart setting instruction as a first setting instruction into the memory, whether or not the memory stores the restart setting instruction as a second setting instruction, the second setting instruction preceding the first setting instruction in the sequence;

making a check to confirm, when the memory stores the second setting instruction, whether or not the second setting instruction is the upper setting instruction corresponding to the setting instruction, the setting instruction succeeding the second setting instruction in the sequence; and deleting the restart information corresponding to the second setting instruction when the second setting instruction is not the upper setting instruction.

8. A control method of controlling a storage device communicably connected to a plurality of information processing apparatuses, the storage device including a memory, and hard disk drives, the method comprising the steps of;

storing, into the memory, configuration information including setting information of capacity of the hard disk drives;

storing, into the memory, edit information indicating that one of the information processing apparatuses is updating the configuration information;

receiving an acquisition instruction for the configuration information from one of the information processing apparatuses;

making a check to determine, when the acquisition instruction is received, whether or not the memory stores the edit information;

transmitting, when the memory stores the edit information, data indicating that the configuration information is being edited to the information processing apparatus as the transmission source of the acquisition instruction;

transmitting, when the memory does not store the edit information, the configuration information to the information processing apparatus as the transmission source of the acquisition instruction;

storing in the memory, when the memory does not store the edit information, an identifier of the information processing apparatus as the transmission source of the acquisition instruction, the identifier being stored;

receiving a setting instruction of the configuration information from the information processing apparatus;

making a check to determine, when the setting instruction is received, whether or not the memory stores as the edit information the identifier of the information processing apparatus as the transmission source of the acquisition instruction;

updating the configuration information according to the setting instruction when the memory stores the identifier of the information processing apparatus as the transmission source of the acquisition instruction; and transmitting to the information processing apparatus as the transmission source of the acquisition instruction, when the memory stores the identifier of the information processing apparatus as the transmission source of the acquisition instruction, data indicating that the configuration information is being edited.

9. A control method of controlling an information processing system including a client computer, a server, a storage device, and a network which connects the client computer, the server and the storage device to each other, wherein the server includes a memory which stores, as virtual configuration information, configuration information including setting information of hard disk drives of the storage device, the memory storing information indicating whether a management mode as a control method of the configuration information is a first mode or a second mode, the control method comprising the steps of:

receiving by the server a setting instruction of the configuration information from the client computer;

updating by the server, when information in the memory indicates that the management mode is the first mode, the virtual configuration information in the memory according to the setting instruction;

storing by the server the setting instruction to update the virtual configuration information into the memory;

transmitting by the server the setting instruction from the memory to the storage device;

transferring by the server, when information in the memory indicates that the management mode is the second mode, the setting instruction to the storage device;

receiving by the server a first management mode selection instruction to select the management mode to the first mode from the client computer;

transmitting by the server, when the first management mode selection instruction is received, an acquisition request to acquire the configuration information to a device;

receiving by the server the configuration information transmitted from the device in response to the acquisition request;

storing by the server, when the first management mode selection instruction is received, information indicating that the management mode is the first mode into the memory;

storing by the server the configuration information received from the storage device into the memory, the configuration information being stored as the virtual configuration information; and transmitting by the server a result of processing said setting instruction to the client computer.

10. A control method of controlling an information processing system including a client computer, a server, a storage device, and a network which connects the client computer, the server and the storage device to each other, wherein the server includes a memory which stores, as virtual configuration information, configuration information including setting information of hard disk drives of the storage device, the memory storing information indicating whether a management mode as a control method of the configuration information is a first mode or a second mode, the control method comprising the steps of:

receiving by the server a setting instruction of the configuration information from the client computer;

updating by the server, when information in the memory indicates that the management mode is the first mode, the virtual configuration information in the memory according to the setting instruction;

storing by the server the setting instruction to update the virtual configuration information into the memory;

transmitting by the server the setting instruction from the memory to the storage device;

transferring by the server, when information in the memory indicates that the management mode is the second mode, the setting instruction to the storage device;

storing a correspondence between the setting instruction and a lower setting instruction into the memory, the lower setting instruction being a setting instruction not required to be reflected in the configuration information when the setting instruction is reflected in the configuration information;

deleting by the server the lower setting instruction when the memory stores the lower setting instruction corresponding to the setting instruction; and transmitting by the server a result of processing said setting instruction to the client computer.

11. A control method of controlling an information processing system including a client computer, a server, a storage device, and a network which connects the client computer, the server and the storage device to each other, wherein the server includes a memory which stores, as virtual configuration information, configuration information including setting information of hard disk drives of the storage device, the memory storing information indicating whether a management mode as a control method of the configuration information is a first mode or a second mode, the control method comprising the steps of:

receiving by the server a setting instruction of the configuration information from the client computer;

updating by the server, when information in the memory indicates that the management mode is the first mode, the virtual configuration information in the memory according to the setting instruction;

storing by the server the setting instruction to update the virtual configuration information into the memory;

transmitting by the server the setting instruction from the memory to the storage device;

transferring by the server, when information in the memory indicates that the management mode is the second mode, the setting instruction to the storage device;

transmitting by the server a result of processing said selling instruction to the client computer; and storing a correspondence between the setting instruction and a cancel setting instruction into the memory, the cancel setting instruction being a setting instruction which creates first configuration information when the cancel setting instruction is reflected in the configuration information together with the setting instruction and which creates second configuration information substantially equal to the first configuration information when the cancel setting instruction is not reflected in the configuration information together with the setting instruction, wherein the step of storing the setting instruction into the memory is the step of deleting the cancel setting instruction without storing the setting instruction into the memory when the memory stores the cancel setting instruction corresponding to the setting instruction.

12. A control method of controlling an information processing system including a client computer, a server, a storage device, and a network which connects the client computer, the server and the storage device to each other, wherein the server includes a memory which stores, as virtual configuration information, configuration information including setting information of hard disk drives of the storage device, the memory storing information indicating whether a management mode as a control method of the configuration information is a first mode or a second mode, the control method comprising the steps of:

receiving by the server a setting instruction of the configuration information from the client computer;

updating by the server, when information in the memory indicates that the management mode is the first mode, the virtual configuration information in the memory according to the setting instruction;

storing by the server the setting instruction to update the virtual configuration information into the memory;

transmitting by the server the setting instruction from the memory to the storage device;

transferring by the server, when information in the memory indicates that the management mode is the second mode, the setting instruction to the storage device;

transmitting by the server a result of processing said selling instruction to the client computer;

configuring the setting instruction with a setting instruction command and at least one parameter for the command; and making a check by the server to confirm whether or not the memory stores a collectable setting instruction, the collectable setting instruction including a setting instruction command substantially equal to that of the setting instruction, wherein the step of storing the setting instruction into the memory comprises the step of:

adding, when the memory stores the collectable setting instruction, the parameter of the setting instruction to the collectable setting instruction, without storing the setting instruction into the memory.

13. A control method according to claim 12, further comprising the steps of:

storing a correspondence between the setting instruction and an upper setting instruction into the memory, the upper setting instruction being a setting instruction required to be reflected in the configuration information before the setting instruction; and making a check by the server to confirm, when the memory stores the upper setting instruction corresponding to the setting instruction, whether or not the memory stores the collectable setting instruction later in the sequence than the upper setting instruction, wherein the step of storing the setting instruction into the memory comprises the steps of:

adding the parameter of the setting instruction to the collectable setting instruction without storing the setting instruction when the memory stores the collectable setting instruction later in the sequence than the upper setting instruction, and storing the setting instruction when the memory does not store the collectable setting instruction later in the sequence than the upper setting instruction.

14. A control method of controlling an information processing system including a client computer, a server, a storage device, and a network which connects the client computer, the server and the storage device to each other, wherein the server includes a memory which stores, as virtual configuration information, configuration information including setting information of hard disk drives of the storage device, the memory storing information indicating whether a management mode as a control method of the configuration information is a first mode or a second mode, the control method comprising the steps of:

receiving by the server a setting instruction of the configuration information from the client computer;

updating by the server, when information in the memory indicates that the management mode is the first mode, the virtual configuration information in the memory according to the setting instruction;

storing by the server the setting instruction to update the virtual configuration information into the memory;

transmitting by the server the setting instruction from the memory to the storage device;

transferring by the server, when information in the memory indicates that the management mode is the second mode, the setting instruction to the storage device;

transmitting by the server a result of processing said setting instruction to the client computer; and storing as a restart setting instruction into the memory a setting instruction requiring a restart of the storage device to be reflected in the configuration information, wherein the step of storing the setting instruction into the memory comprises the step of:

storing, when the setting instruction is the restart setting instruction, the setting instruction and restart information indicating requirement of a restart with a correspondence established therebetween, and wherein the step of storing the setting instruction into the storage device comprises the step of:

transmitting, in the transmission of the setting instruction to the storage device, the setting instruction to the storage device and transmitting thereafter an instruction of a restart thereto when the memory stores the restart information corresponding to the setting instruction.

15. A control method according to claim 14, further comprising the steps of:

storing into the memory a correspondence between the setting instruction and an upper setting instruction required to be reflected in the configuration information before the setting instruction;

making a check by the server to confirm, when storing the restart setting instruction as a first setting instruction into the memory, whether or not the memory stores the restart setting instruction as a second setting instruction, the second setting instruction preceding the first setting instruction in the sequence;

making a check by the server to confirm, when the memory stores the second setting instruction, whether or not the second setting instruction is the upper setting instruction corresponding to the setting instruction, the setting instruction succeeding the second setting instruction in the sequence; and deleting by the server the restart information corresponding to the second setting instruction when the second setting instruction is not the upper setting instruction.

* * * * *